Dec. 5, 1939.   B. J. SADOFF   2,182,181
CUTTER
Filed May 10, 1937

ATTEST.
Norbert E. Birch
Wm. C. Meiser

Bernard J. Sadoff
INVENTOR
BY
ATTORNEY

Patented Dec. 5, 1939

2,182,181

UNITED STATES PATENT OFFICE 2,182,181

CUTTER

Bernard J. Sadoff, Buenos Aires, Argentina, assignor to Industrial Patents Corporation, Chicago, Ill., a corporation of Delaware Application May 10, 1937, Serial No. 141,853

1 Claim. (Cl. 30—290)

This invention relates to an improved cutting means.

One of the objects of this invention is to provide an improved cutting means.

Other objects of the invention will be apparent from the description and claim which follow.

In accordance with the present invention, a cutter is rigidly secured to a sausage linking device and thus forms an integral part of the sausage linking device for cutting off the ends of the stuffed casings thereby enabling the operator to complete the final step in the linking operation.

In the cutter disclosed in the present file, the knife blade is adjustably mounted relative to a fixed guard so as to permit successive mountings of the blade regardless of the wear resulting from sharpening.

In the drawing like characters of reference are used to designate similar elements.

Figure 1:
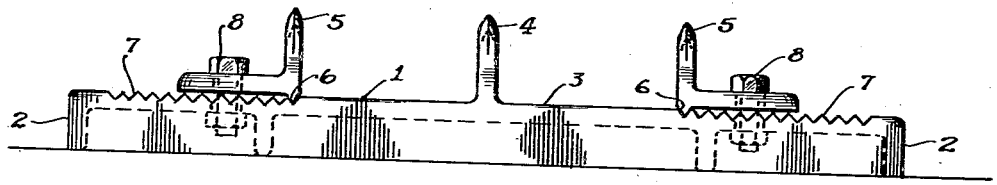
Figure 1 is a side view illustrating one form of sausage linking gauge with which the cutter of the present invention may be utilized.

The sausage linking gauge, illustrated in Figure 1, comprises a base plate 1 mounted upon risers 2 and provided, at its upper surface 3, with a fixed central gauge member 4 and a pair of gauge members 5 movably mounted to either side of fixed gauge member 4. Gauge members 5 may be fixedly secured in spaced relation with gauge member 4 by tooth 6 in engagement with one of a series of notches 7 and bolt 8.

The cutter of the present invention preferably comprises a single cast member 9 providing a base portion 10 and an upwardly extending guard member 11. Base portion 10 is provided with outwardly extending flange members 12 provided with openings 13 for securing the cutter to base plate 1. Base portion 10 is recessed, as at 14, for suitably mounting blade 15 and extension plates 16 and slotted, as at 17, for securing blade 15 as it extends beyond extension plates 16.

Figure 3:
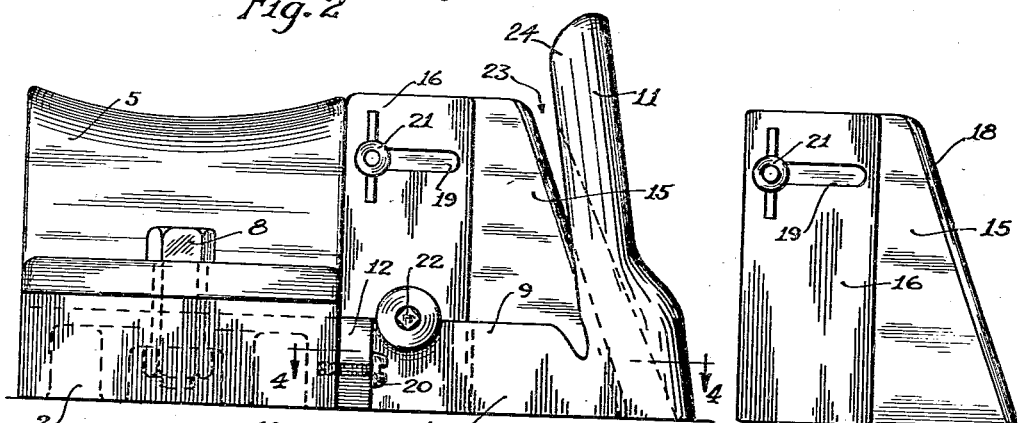
Figure 3 is an enlarged end view of the linking gauge and cutter shown in Figure 2.
Figure 5:
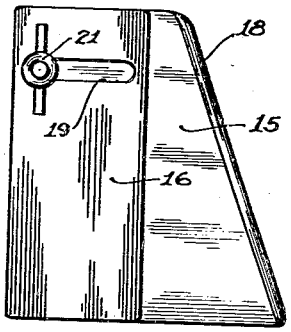
Figure 5 is a side view of the cutter blade showing the extension plates secured thereto.
Figure 4:
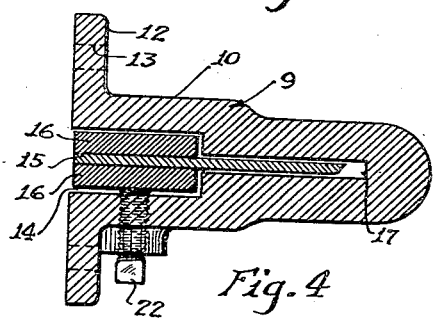
Figure 4 is a sectional view of the blade holder taken on line 4—4 of Figure 3.
Figure 6:
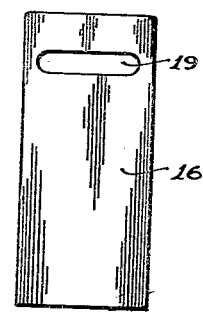
Figure 6 is a side view of one of the extension plates.
Figure 7:
Figure 7 is an end view of the extension plate shown in Figure 6.

The forward edge of blade 15 is tapered to provide angular cutting edge 18. As shown in Figure 3, slot 17 is extended a suitable distance into the adjacent surface 24 of the guard member 11 to permit movement of the blade 15 relative to the guard member 11 with the cutting edge 18 intersecting the surface 24. Extension plates 16, of metal or other suitable material, are substantially rectangular and are transversely slotted, as at 19, to permit adjustment of blade 15 therebetween.

Figure 2:
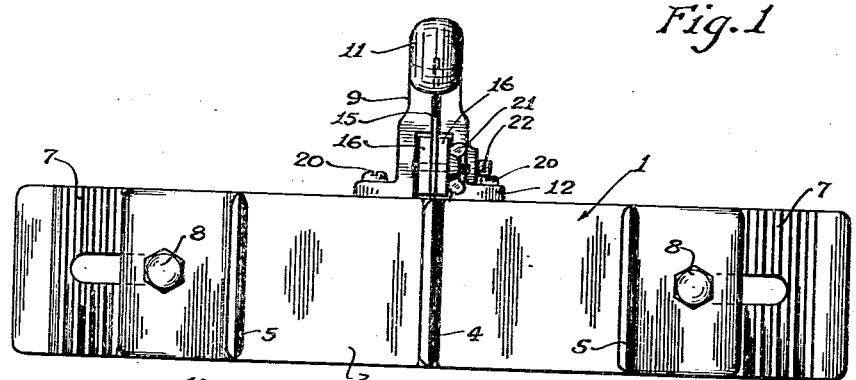
Figure 2 is a plan view of the sausage linking device illustrated in Figure 1 showing the cutter of the present invention attached thereto.

In assembling the linking gauge and cutter, the flanges 12, as shown in Figure 2, are rigidly secured adjacent base plate 1, as by bolts 20, and extension plates 16 are rigidly secured adjacent either side of blade 15, as by wing nut 21 passed through the slots 19 of the plates 16 and a suitable opening in the blade 15. The blade 15 and plates 16, in assembled order, are then inserted in recess 14 with the projecting portion of blade 15 in slot 17. The blade and plate assembly are rigidly secured in base portion 10 by set screw 22.

It will be seen that by loosening set screw 22 and wing nut 21, blade 15 may be horizontally moved between plates 16 so as to provide suitable adjustment relative to guard member 11. In practice, blade 15 is adjusted so that cutting edge 18 will angularly intersect guard member 11 thus forming a substantially V-shaped throat 23.

It will also be seen that blade 15, regardless of wear due to sharpening cutting edge 18 and the like, may be readily adjusted relative to guard member 11.

In use, the end of the casing to be cut is moved downwardly into throat 23 whence it will be forced by guard member 11, against cutting edge 18 and quickly severed.

It, of course, will be understood that the cutter of the present invention while exemplified for use with a sausage linking gauge, is equally adapted for cutting thread, twine, and the like.

I claim:

A cutter comprising a base, a guard member extended from the base, a recess in the base, a continuous slot extended from the recess, through the base and within the adjacent surface of the guard member, a pair of extension plates adapted to be rigidly secured within the recess, a knife blade adjustably secured between the extension plates and within the slot in the base for movement from and toward the guard member and within the slotted surface of the guard member, the knife blade providing a cutting edge angularly extended relative to the slotted surface of the guard member and mounted to intersect the slotted surface of the guard member.

B. J. SADOFF